United States Patent [19]

Fujishima

[11] Patent Number: 5,154,937
[45] Date of Patent: Oct. 13, 1992

[54] ELASTIC FORMING DIE AND DEVICE FOR FORMING MOLDED PRODUCTS

[75] Inventor: Toshiya Fujishima, 3-36, Jukkenzaka 1-chome, Chigasaki-shi, Kanagawa-ken, Japan

[73] Assignees: Okamoto Industries; Fujino Syouko Co., Ltd., both of Tokyo; Toshiya Fujishima, Kanagawa, all of Japan

[21] Appl. No.: 603,627

[22] Filed: Oct. 26, 1990

[30] Foreign Application Priority Data

Oct. 27, 1989 [JP] Japan .................................. 1-280373
Nov. 10, 1989 [JP] Japan .................................. 1-293040

[51] Int. Cl.$^5$ .................................................. B28B 7/30
[52] U.S. Cl. .................................. 425/440; 249/127; 264/313; 264/334; 425/DIG. 44
[58] Field of Search ............... 249/127; 425/440, 437, 425/438, DIG. 44; 264/313, 314, 334, 335

[56] References Cited

U.S. PATENT DOCUMENTS

| Re. 20,460 | 8/1937 | Jeffery | 264/314 |
|---|---|---|---|
| 4,045,153 | 8/1977 | Maurino et al. | 264/335 |
| 4,104,411 | 8/1978 | Pooler | 249/127 |
| 4,802,839 | 2/1989 | Hidawa | 249/127 |
| 4,854,843 | 8/1989 | Takeda et al. | 249/127 |

FOREIGN PATENT DOCUMENTS

| 0220898 | 5/1987 | European Pat. Off. . | |
|---|---|---|---|
| 58-187330 | 11/1983 | Japan | 425/437 |
| 62-175160 | 7/1987 | Japan . | |
| 62-220310 | 9/1987 | Japan . | |

Primary Examiner—Jay H. Woo
Assistant Examiner—Robert B. Davis
Attorney, Agent, or Firm—Sherman and Shalloway

[57] ABSTRACT

An elastic forming die with an aperture section through which a molding material is charged, including a main mold section in membrane form which acts as a female mold for the molded product; a conical section in membrane form which is connected to the aperture section and expands outwardly in the shape of a cone; and an aperture roll section provided at the outer peripheral edge of the cone section, and a method for manufacturing this elastic forming die. Because the elastic forming die is provided with the conical section which is connected to the aperture section and expands outwardly, the release of the molded product from the mold is extremely easy and the elastic forming die can be used to manufacture molded products such as chocolate, jelly, and the like. The molding method using the elastic forming die features the release of the molded product utilizing said cone section.

2 Claims, 6 Drawing Sheets

ELASTIC FORMING DIE AND DEVICE FOR FORMING MOLDED PRODUCTS

BACKGROUND OF THE INVENTION

1. Field of the Invention

The present invention relates to an elastic forming die and a method for manufacturing products molded from chocolate, jelly, wax, and the like, and, in particular, to a mold release method and device for the molding method and device using the elastic forming die.

2. Description of the Prior Art

Conventionally, chocolate confections, jelly confections, frozen confections, ice, sugar cubes, soap cakes, wax, and the like are produced by filling a forming die with a molding material in liquid, powder, or granule form, then solidifying the material.

A metal mold is most frequently used as a forming die for obtaining these molded goods, but in order to manufacture molded goods with complicated shapes it is necessary to use a complicated split die of a suitable construction. As a result, the cost of the metal mold and the cost of manufacturing are very high. In addition, there are limitations on the shapes in which the molded goods can be produced.

In order to resolve these problems, an elastic forming die has been proposed, comprising a main mold section with an elastic membrane which acts to release the molded product and a fixed leaf of elastic membrane which is connected to an aperture in the main mold section and extends as a plane surface (Japanese Laid-Open Patent Application No. 175160/1987).

A molding device using the above-mentioned conventional elastic forming die into which material for the molded product is filled has been proposed (Japanese Laid-open Patent Application No. 220310/1987) comprising a filling device for charging the molding material into the elastic forming die, a solidifying device for solidifying the charged molding material, an expanding device for expanding a filling aperture to remove the solidified molded product from the elastic forming die, and an expelling device for pressing out the filled material.

The above-mentioned conventional elastic forming die has the advantage that it is possible to manufacture molded products in a wide variety of shapes at low cost for both the molds and the manufacturing process. However, when the molding material is filled into the elastic forming die there is the problem that securing the elastic forming die and removing the solidified molded product from the elastic forming die, and the like, is rather difficult.

In addition, as the thickness of the membrane at the aperture of the main mold section is increased it becomes more difficult to expand the part, therefore there are occasions when removal of the elastic forming die from the base die and extraction of the molded product from the elastic forming die are not easy.

Also, when manufacturing the elastic forming die, part of the elastic membrane attached to the base die is not required and must be removed. For this reason there is the problem that some elastic material is wasted and a removal process is necessary.

In a molding device using the above-mentioned conventional elastic forming die, an expansion device is provided to expand the aperture section (the filling aperture) to remove the molded product, which has solidified inside the elastic forming die, from the die. The molded product is released from the elastic forming die by means of this expansion device.

However, when this expansion device (mold release device) is used, the periphery of the fixed leaf (flange section) of the elastic forming die is contained by a plurality of clamping members which are constructed so that they can be stretched outward in the radial direction. Because the part that is clamped by the clamping members is considerably expanded, while the other parts are not expanded to any great extent, the expansion of the aperture section is not uniform, which makes it difficult to release the molded product from the elastic forming die, and causing the problem that the elastic forming die is easily damaged. In addition, because the clamping members must be stretched a suitable distance only, at a uniform velocity in the outward radial direction, there is the problem that the expansion device becomes large and complicated.

SUMMARY OF THE INVENTION

An object of the present invention is to provide, with due consideration to the drawbacks of such conventional devices, an easily handled elastic forming die from which the molding material or molded product are easily removed, and a manufacturing method which achieves the production without wastage of the molding material.

A further object of the present invention is to provide a molding method and a molding device by which it is possible to easily release the filled, solidified molded product in the elastic forming die from the elastic forming die.

These objects are achieved in the present invention by the provision of an elastic forming die into which a charging material is filled and solidified to obtain a molded product, comprising a main mold section in membrane form provided with an aperture section at one end through which the charging material is filled, and which serves as a female mold for the molded product; a conical section in membrane form which is connected to the aperture section and expands outwardly in the shape of a cone; and an aperture roll section provided at the outer peripheral edge of the cone section.

These objects are further achieved in the present invention by the provision of a method for manufacturing an elastic forming die into which a charging material is filled and solidified to obtain a molded product, comprising a process using a base mold which in turn comprises a forming die corresponding to the outer shape of a molded product; a conical section, connected to the forming die section, which expands outwardly in the shape of a cone; and a column section connected to the conical section, wherein the base mold is immersed in a solution of an elastic material and an elastic membrane is formed as a gel on the surface of the base mold; a process wherein the elastic membrane which is formed on the column section of the base mold is rolled up toward the conical section to form the aperture roll section; a process for drying the elastic membrane; and a process wherein the aperture roll section is stretched toward the forming die section and the main body of the elastic membrane is peeled from the base mold.

These objects are further achieved in the present invention by the provision of a process for molding a charged molded product using an elastic forming die comprising a main mold section in membrane form which acts as a female mold for the molded product; a conical section in membrane form which is connected to an aperture section of the main mold section and expands outwardly in the shape of a cone; and a ring-shaped support member mounted on the outer cylindrical edge of the conical section; wherein, after a flowable molding material is charged into the main mold section and solidified, a ring-shaped pusher member with an outer form smaller than the inner form of the support member and an inner form larger than the outer form of the main mold section is positioned at the bottom of the conical section, and the support member is moved downward relative to the pusher member, so that the conical section and the aperture section are pulled outward in the radial direction, and the solidified molded product is released.

These objects are further achieved in the present invention by the provision of a molding device for a charged molded product which releases the charged molded product, which has been solidified inside a main mold section, from an elastic forming die comprising the main mold section in membrane form which acts as a female mold for the molded product; a conical section in membrane form which is connected to an aperture section of the main mold section and expands outwardly in the shape of a cone; and a ring-shaped support member mounted on the outer cylindrical edge of the conical section; using a mold release device comprising a ring-shaped pusher member with an outer form smaller than the inner form of the support member and an inner form larger than the outer form of the main mold section which is positioned on the bottom of the conical section; a transfer member for moving the support member downward relative to the pusher member; and a removal member for removing the charged molded product away from the forming die.

Furthermore, in the molding device for a charged molded product the pusher member is provided on the upper end section of a mold release vessel contained inside the main mold section; and the mold release vessel is provided with a feed and exhaust port for feeding air into and discharging air out of the mold release vessel.

By filling the molding material into the main mold section and causing it to solidify it is possible to form a molded product which conforms to the shape of the main mold section. Then, by pulling the aperture roll section toward the main mold section, the solidified molded product is peeled away from the elastic forming die.

As will be later explained, the molding action and the release action are extremely simple. In addition, because the cone section is inclined at an angle, there is a large angle between the main mold section and the boundary section which makes it possible to avoid having large amounts of adhering material remain when the elastic forming die is being manufactured.

The forming die into which the molding material is filled and solidified is supported by the support section. The support section is moved downward, relative to the pusher member which is positioned at the bottom of the cone section, in the state in which the lower surface of the cone section is in contact with the pusher member, and the support section is pulled downward. Then the cone section and the aperture section extend outward in the radial direction so that the upper part of the main mold section is peeled away from the charged product.

In this condition, when a negative pressure source is connected to the feed and exhaust port and the air inside the mold release vessel is exhausted, a negative pressure is created inside the mold release vessel and the elastic forming die is pulled to the inner peripheral surface of the release vessel so that the charged molded product is completely peeled away from the main mold section.

The transfer member moves the support section downward relative to the pusher member.

The removal member removes the peeled, charged molded product from the main mold section out of the system.

When the support section is moved relative to the pusher member and compressed air is supplied from the feed and exhaust port, a film of air is formed between the pusher member and the cone section so that the friction between the pusher member and the cone section is reduced, causing the pusher member to slide smoothly on the cone section.

By causing the support section to move downward relative to the pusher member, either the support section can descend or the pusher member can be elevated, or both actions can occur.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

An embodiment of an elastic forming die and a method for manufacturing the elastic forming die will first be explained with reference to the drawings.

Figure 1:
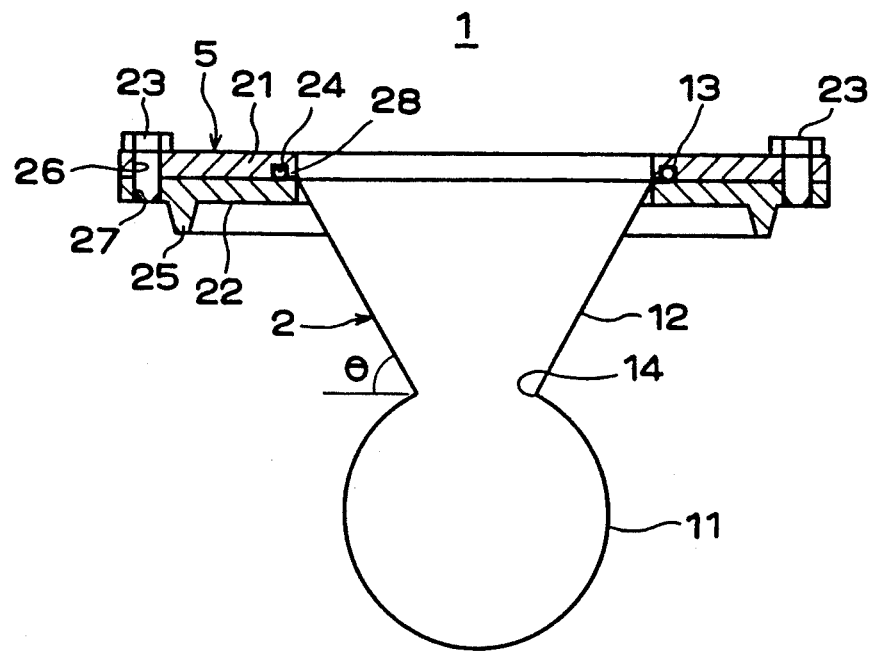
FIG. 1 is an elevational view in section of an elastic forming die of the present invention.
Figure 2:
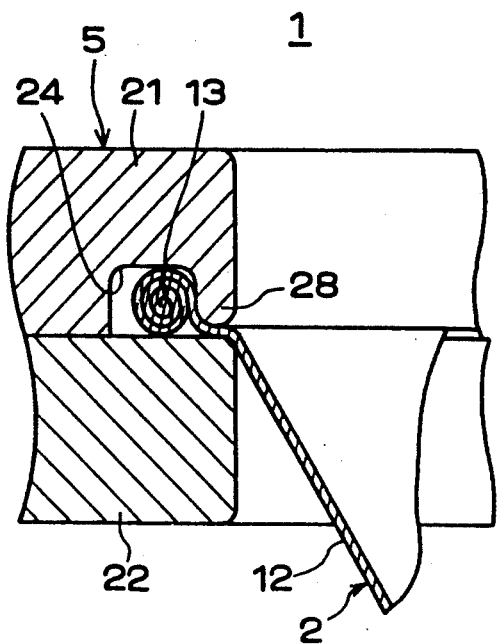
FIG. 2 is a partial sectional view of a support section of the elastic forming die of the present invention.

FIG. 1 is an elevational view in section of an elastic forming die 2 related to the present invention, while FIG. 2 is a partial sectional view of a support section for the elastic forming die 2.

The elastic forming die 2 comprises a main mold section 11 formed as a membrane with an aperture section 14 at one end, a cone section 12 formed as a connected to the aperture section 14 and which expands outwardly in the shape of a cone, and an aperture roll section 13 provided at the outer peripheral edge of the cone section 12.

A support ring 5 is installed at the aperture roll section 13 of the cone section 12. These components together comprise an elastic forming die device 1.

The elastic forming die 2, as will be later described, is formed as a membrane from an elastic material such as natural latex rubber or the like.

The main mold section 11, which is filled by causing a liquid material such as chocolate, jelly, wax, or the like to flow into it, acts as a female mold section for solidifying and shaping the material. In this embodiment the main mold section 11 is provided in the form of a sphere, but this shape is optional and depends on the shape of the molded product, specifically, the final product.

The cone section 12 supports the main mold section 11 and the molding material which is filled into the main mold section 11 during the manufacture of the molded product. After the molding material has solidified, an aperture section 14 in the cone section 12 is expanded to allow the molded product to be extracted from the main mold section 11.

By providing the cone section 12 with a conical surface, when the elastic forming die 2 is being manufactured, the film at the boundary between the main mold section 11 and the cone section 12 does not become too thick. When the molded product is manufactured, the aperture section 14 is stretched and expanded, making it easy to extract the molded product. In addition, because the cone section 12 has a conical surface, in comparison with the case where it has a plane surface, the weight of the main mold section 11 and the molded product can be supported in a stable condition.

Further, by making the cone section 12 conical, when the elastic forming die 2 is manufactured, the film thickness of the cone section 12 is about the same as the other sections, and can easily be fabricated in a uniform manner. From this aspect, it is desirable that the angle $\theta$ at which the cone section 12 is inclined (the angle with respect to the bottom of the cone surface) be about 20° to 30° or greater.

With this embodiment, the angle of inclination $\theta$ of the cone section 12 is about 60° but this depends on the shape of the molded product, the size, weight, type of molding material, the manufacturing conditions, and the like. It is possible to make various changes in these conditions, ranging from a surface which is almost a plane surface, to a cylindrical surface.

The aperture roll section 13 is formed by rolling up an elastic membrane which has been formed as a cylinder. The aperture roll section 13 is used to support the entire elastic forming die 2. The support ring 5 is mounted as outlined above. The diameter of the aperture roll section 13 is larger than the maximum outer diameter of the main mold section 11 to allow a base mold 7, or the molded product, to be drawn out of the elastic forming die 2 when the elastic forming die 2 is being manufactured and when the molded product is being manufactured, respectively.

The support ring 5 is made from a synthetic resin or the like and comprises an upper ring member 21, in which an annular ring-shaped groove 24 is provided, and a lower ring member 22 provided with an annular engaging ring section 25 which performs a positioning function. A plurality of holes 26, 26, . . . , which pass through the upper ring member 21, and a matching plurality of bolt holes 26, 26, . . . , which pass through the lower ring member 22, are mutually connected by a plurality of securing bolts 23, 23, . . . , with one bolt 23 penetrating each aligned set of holes.

The aperture roll section 13 of the elastic forming die 2 is fitted into the ring-shaped groove 24, and the inner section of the aperture roll section 13 is lightly held between an inner peripheral edge 28 of the upper ring member 21 and the upper surface of the lower ring member 22 to effectively mount the elastic forming die 2 on the support ring 5.

The method for manufacturing the elastic forming die 2 will now be explained with reference to the drawings.

Figure 3:
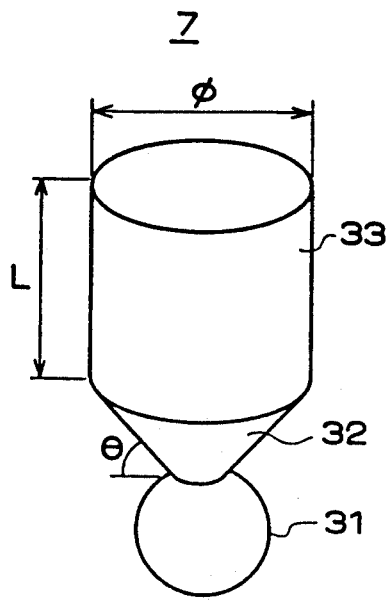
FIG. 3 is a perspective view of a base mold for manufacturing an elastic forming die.

FIG. 3 is a perspective view of the base mold 7 for manufacturing the elastic forming die 2.

The base mold 7 is fabricated from clay or a synthetic resin and comprises a forming die section 31 which corresponds to the outer shape of the molded product, a cone section 32 which is attached to the forming die section 31 and expands outwardly in the shape of a cone, and a column section 33 connected to the cone section 32.

The forming die section 31, the cone section 32, and the column section 33 correspond to the main mold section 11, the cone section 12, and the aperture roll section 13 of the elastic forming die 2 respectively.

The diameter $\phi$ of the column section 33 is larger than the maximum outer diameter of the forming die section 31. For easy handling of the elastic forming die 2 it is desirable that the diameter $\phi$ and the length L of the column section 33 be made common for various models of the forming die section 31 provided as a series. For example, these dimensions may be the same nominal size in common, regardless of the difference in shapes of the various forming die sections 31, or in common for one set of related molded products.

FIGS. 4(a) to 4(g) are views of a typical manufacturing process for the elastic forming die 2.

First, the base mold 7 is washed to remove any adhering foreign material and thoroughly dried. Following this, a suitable preprocessing step is carried out by means of, for example, a treatment with a calcium nitrate solution or heating to a suitable temperature so that a liquid elastic material DY (which will be later explained) will reliably adhere.

Figure 4A:
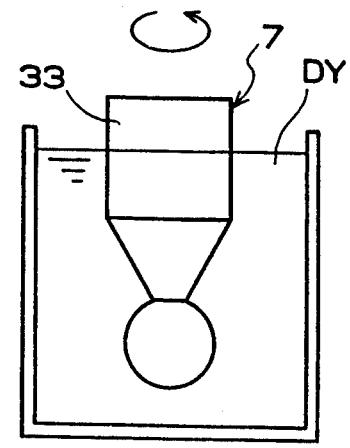
FIG. 4(a)–4(g) is a view of a typical manufacturing process for an elastic forming die.
Figure 4B:
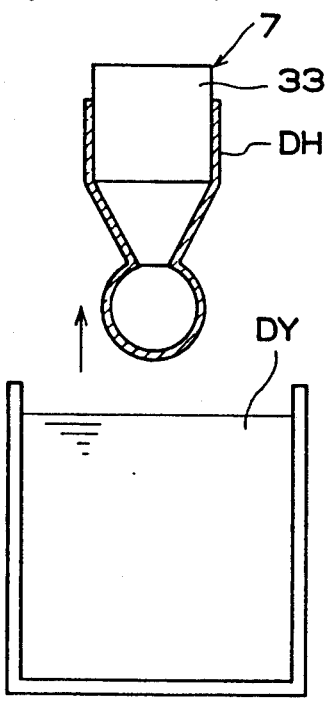

Next, as shown in FIG. 4(a), the base mold 7, with the exception of the upper end of the column section 33, is immersed in the liquid elastic material DY and removed after about 10 to 15 minutes with about 0.8 to 1.0 mm of the liquid elastic material DY formed as a gel on the surface of the base mold 7 [FIG. 4(b)]. It is desirable to rotate the base mold 7 while it is immersed in the liquid elastic material DY, to prevent the incorporation of air bubbles or to ensure that the thickness of the film of elastic material DY is uniform. The base mold 7 may also be inclined in a suitable direction if the forming die section 31 has a complicated shape.

The liquid elastic material DY can be natural rubber latex, silicone rubber, urethane rubber, butadiene rubber or the like, with a small amount of a surfactant or the like mixed in.

Figure 4C:
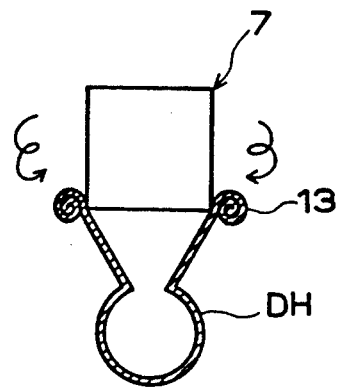
Figure 4:
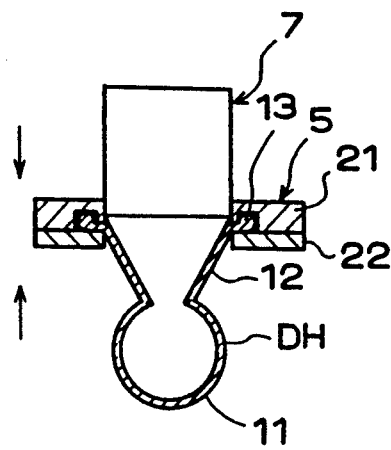
Figure 4:
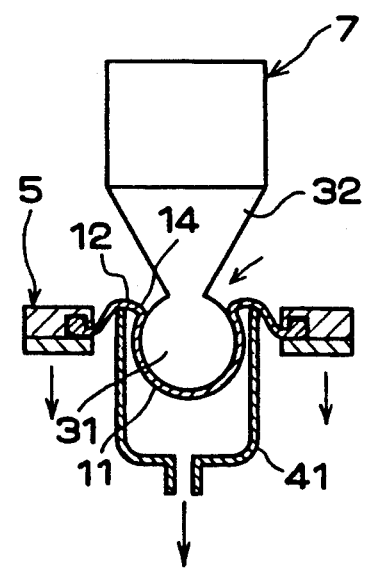
Figure 4:
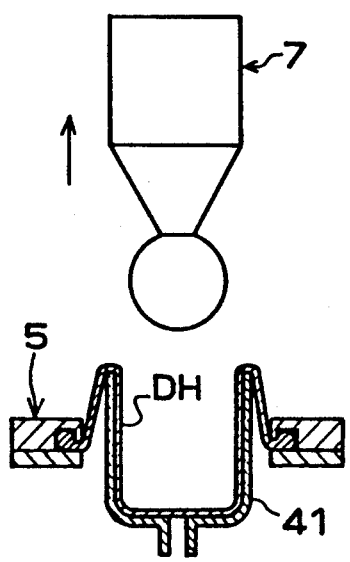
Figure 4:
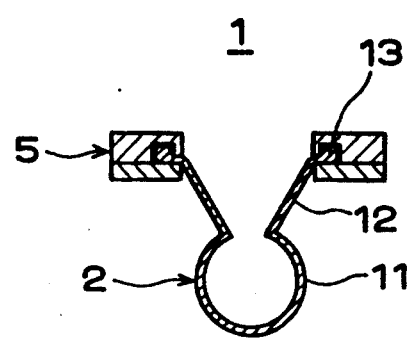

Next, as shown in FIG. 4(c), an elastic membrane DH adhering to the outer peripheral surface of the column section 33 of the base mold 7 is rolled downward from the upper end (toward the cone section 12) to form the aperture roll section 13.

Following this, the elastic membrane DH is dried at a suitable temperature, for example, about 80° to 90°, for about 60 to 90 minutes and vulcanized.

Next, as shown in FIG. 4(d), the support ring 5 is mounted on the aperture roll section 13.

Then, as shown in FIG. 4(e), the forming die section 31 of the base mold 7 is inserted into a cap-shaped jig vessel 41 and the support ring 5 is pulled downward. In this manner the cone section 12 and the main mold section 11 of the elastic membrane DH are pulled outward in the radial direction and the cone section 12, aperture section 14 of the main mold section 11, and the main mold section 11 are peeled away from the base mold 7, in that order. During this time, an air jet is directed between the base mold 7 and the main mold section 11, and the air in the jig vessel 41 is exhausted by drawing a vacuum, to assist in peeling the elastic membrane DH from the base mold 7.

After the elastic membrane DH has been completely peeled away from the base mold 7, the base mold 7 is lifted upward [FIG. 4(f)].

The air jet and the vacuum on the jig vessel 41 are halted, and the elastic membrane DH is removed from the jig vessel 41 to obtain the elastic forming die 2 [FIG. 4(g)].

Finally, an after-treatment consisting of a hot water treatment followed by drying is carried out.

Using the manufacturing method for the elastic forming die 2 of this embodiment, as outlined above, all the elastic membrane DH adhering to the base mold 7 becomes part of the elastic forming die 2, therefore, no unused portion is produced, there is no waste elastic membrane DH and therefore no removal process is required, and the efficiency is therefore good.

By causing the base mold 7 to rotate, any mixing of air bubbles into the elastic membrane DH is easily eliminated and it is possible to easily obtain a uniform film thickness in the elastic membrane DH.

Because the cone section 32 of the base mold 7 has an angle of inclination $\theta$, an angle is formed between the forming die section 31 and its boundary section (corresponding to the aperture section 14 of the elastic forming die 2) is large compared to the case where the cone section 32 is a plane shape (specifically, in the case where the angle of inclination $\theta$ is 0°). For this reason, large amounts of the liquid elastic material DY do not adhere to the boundary section, and accordingly the film of the aperture section 14 of the elastic forming die 2 is not very thick compared to the other sections.

Therefore, the elasticity of the aperture section 14 of the elastic forming die 2 can be maintained, and when the molded product is being manufactured it is easy to expand the aperture section 14 to remove the molded product. In addition, the liquid elastic material DY adheres easily to the cone section 32, so the film thickness of the cone section 12 can easily be made uniform.

The cone section 33 of the base mold 7 and the cone section 32 are easily processed, the base mold 7 is easily handled, and, because the peeling of the elastic forming die 2 from the base mold 7 is also easy, the cost of the base mold 7 and the manufacturing costs are low. Also, an elastic forming die 2 with a complicated shape can be manufactured.

Provision of the support ring 5 is extremely advantageous in manufacturing the elastic forming die 2 and in manufacturing the molded product using the elastic forming die 2. In addition, because the support ring 5 is easily installed during the manufacturing process for the elastic forming die 2, it can be used without modification in the subsequent manufacture of the molded product.

When the elastic forming die 2 of the present embodiment is used as outlined above, it is possible to support the weight of the main mold section 11 in a stable manner by means of the cone section 12. The release and withdrawal of the molded product from the elastic forming die 2 is therefore easily performed.

Furthermore, because the support ring 5 is installed as part of the elastic forming die device 1, the handling of the elastic forming die 2 is extremely easy, and because the engaging ring section 25 is provided for positioning the support ring 5, the positioning of the cap-shaped jig vessel 41 by means of the taper of the engaging ring section 25 is easily carried out. The same effect is obtained when the molded product is manufactured.

In the foregoing embodiment, it is also acceptable to provide an arc in the boundary sections between the forming die section 31 and the cone section 32, and between the cone section 32 and the cone section 33 of the base mold 7.

The structure, shape, dimensions, and materials of construction of the base mold 7, the elastic forming die 2, and the support ring 5, and the like, can be variously changed from those outlined above.

Next, a detailed explanation will be given of a forming method and a forming device for forming the molded product using the above-mentioned elastic forming die. A distinctive feature of the forming method and device of the present invention is a mold release means.

Figure 5:
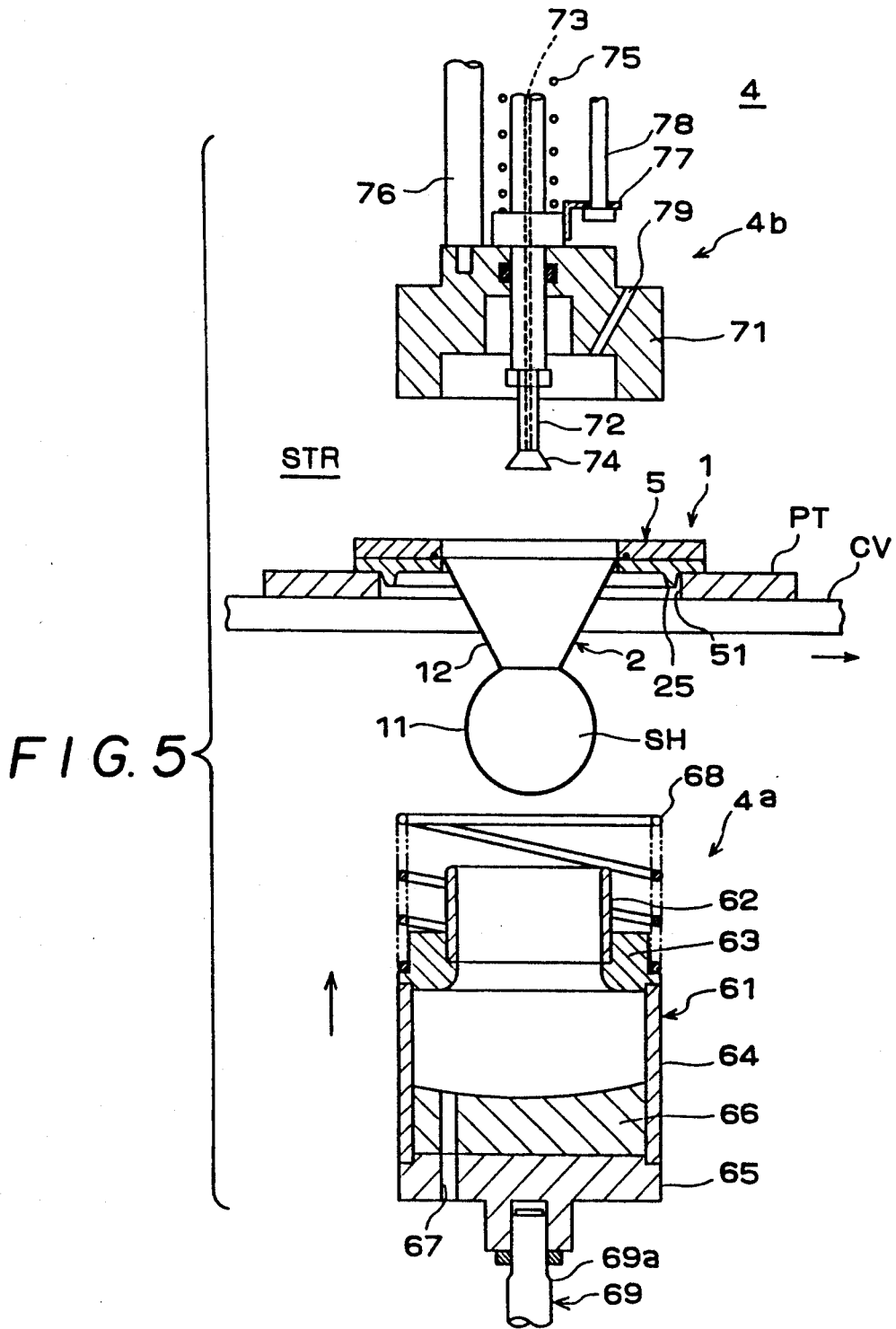
FIG. 5 is an elevational view in section of a mold release device on the molding device of the present invention.

FIG. 5 is an elevational view in section of a mold release device on the molding device of the present invention. FIG. 6 is a view of a typical mold release action by the mold release device.

First, the elastic forming die 2 is supported utilizing the support ring 5 of the elastic forming die device 1, as shown in FIG. 1, at a filling station (omitted from the drawing), and molding material is filled into the main mold section 11 of the elastic forming die 2.

Next, the charged molding material is solidified by cooling, heating, humidifying and the like at a solidification station (omitted from the drawing).

The molded product which has been solidified inside the elastic forming die 2 is then released and removed from the elastic forming die 2 by means of a mold release device 4 at a mold release station STR shown in FIG. 5.

The mold release device 4 will now be explained in detail.

FIG. 5 is an elevational view in section of the mold release device 4 of the present invention.

A conveyor CV is provided as a circulating system routing means by way of the above-mentioned filling station, hardening station, and mold release station STR, as well as by way of a preheating station, washing station, and the like, provided as required. A plurality of pallets PT is conveyed on the conveyor CV and these pallets PT are circulated to each station by the conveyor CV and positioned at each station as required.

A hole 51 is provided in the pallet PT. The outer periphery of the engaging ring section 25 of the support ring 5 is fitted snuggly into the hole 51 so that the elastic forming die device 1 is positioned on the pallet PT.

The elastic forming die device 1 into which the molding material is charged and solidified is transported by the pallet PT to the mold release station STR. A position-detecting sensor (omitted from the drawing) detects the position of the pallet PT and positions the pallet PT at the mold release station STR.

The mold release device 4 comprises a lower device 4a mounted below the conveyor CV and an upper device 4b mounted above the conveyor CV.

The lower device 4a comprises a mold release vessel 61, a support block 66, a support spring 68, and an elevating drive device 69.

The mold release vessel 61 comprises a cylindrical pusher member 62, a support ring 63 which supports the cylindrical pusher member 62, a cylindrical peripheral wall member 64, and a bottom member 65.

The outer form of the pusher member 62 is smaller than the inner form of the support ring 5, and the inner form of the pusher member 62 is larger than the outer form of the main mold section 11. Elevation of the mold release vessel 61 by means of the elevating drive device 69 causes downward pressure on the cone section 12 of the elastic forming die 2. The upper end of the pusher member 62 is formed as a smooth arc.

The support block 66 is made from a soft material such as a sponge material or synthetic rubber, and supports the lower surface of the main mold section 11 as required.

The outer periphery of the support spring 68 fits snuggly into the inner periphery of the engaging ring section 25 of the support ring 5 when the lower device 4a is elevated. The support ring 5 supports the entire body of the elastic forming die device 1 when pressed upward from the bottom.

A feed and exhaust port 67 is provided in the mold release vessel 61. The feed and exhaust port 67 is selectively connected to a compressed air source or a negative pressure source through a switching valve (omitted from the drawing).

The elevating drive device 69 reciprocatingly drives a compressed air cylinder or the like, linearly. The end of a rod 69a is linked to the center of the bottom member 65.

The upper device 4b comprises an upper restraining device 71, a vacuum rod 72 provided with a flow orifice 73, a suction pad 74 installed at the lower end of the vacuum rod 72, an elevating drive device 76 which elevatingly drives the upper restraining device 71, an elevating drive device 78 which elevatingly drives the vacuum rod 72, and a compression spring 75 which energizes the vacuum rod 72 downward.

The bottom end of the upper restraining device 71 just contacts the upper surface of the support ring 5 when the elastic forming die device 1 is elevated, forming a tight seal between the inner section of the elastic forming die 2 and the inner section of the upper restraining device 71. A feed and exhaust port 79 is provided in the upper restraining device 71. The feed and exhaust port 79 is connected to a compressed air source through a switching valve (omitted from the drawing).

The vacuum rod 72 can be elevated while maintaining a seal with the upper restraining device 71. The end of the flow orifice 73 is connected to a negative pressure source through a switching valve (omitted from the drawing) so that the suction pad 74 becomes attached by suction to the upper surface of a molded product SH.

The elevating drive device 78 engages a hole in a bracket 77 mounted on the vacuum rod 72 from the bottom, and when the elevating drive device 78 moves upward the vacuum rod 72 is also elevated.

The entire body of the upper device 4b can be moved in the direction perpendicular to its bottom surface in FIG. 5 by means of a removal device (omitted from the drawing) so that the molded product SH attached to the suction pad 74 is removed on a removal conveyor (omitted from the drawing).

Next, the operation of the mold release device 4 will be explained.

FIGS. 6(a) to 6(d) are views of a typical mold release operation by the mold release device 4.

As illustrated in FIG. 5, first, the mold release vessel 61 is elevated by means of the elevating drive device 69.

When the mold release vessel 61 moves upward, the support spring 68 pushes against the bottom surface of the support ring 5, so that the elastic forming die device 1 is lifted upward by the upper surface of the support ring 5 pressing against the lower surface of the upper restraining device 71.

Figure 6A:
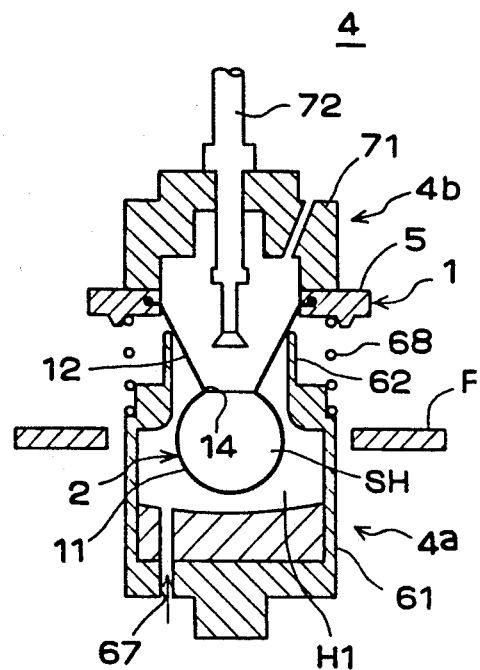
FIG. 6(a)–6(d) are views of a typical mold release action by the mold release device.

Then, as shown in FIG. 6(a), in the state immediately before the upper end of the pusher member 62 contacts the lower surface of the cone section 12, compressed air at a pressure of several Kg/cm$^2$ is supplied from the feed and exhaust port 67, whereupon the compressed air enters a chamber H1 inside the mold release vessel 61 and passes between the upper end of the pusher member 62 and the lower surface of the cone section 12, expelling the contained air, thereby creating a film of air between the upper end of the pusher member 62 and the lower surface of the cone section 12. Accordingly, the pusher member 62 pushes the cone section 12 upward from the upward motion of the mold release vessel 61, and the friction resistance between them is greatly lowered as a result of the air film. The elastic forming die 2 is smoothly expanded and the subsequent mold release action of the molded product SH from the elastic forming die 2 is smoothly performed.

Figure 6B:
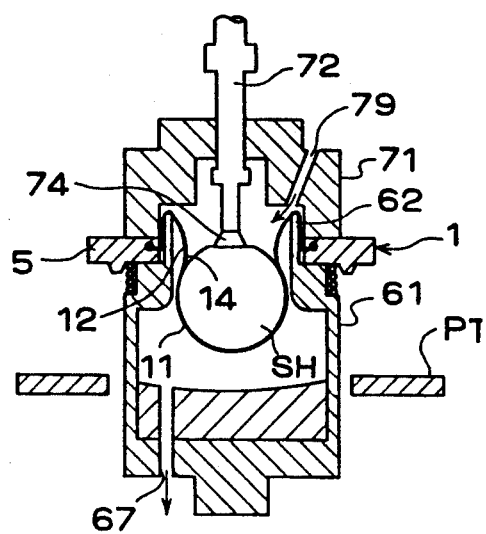

As shown in FIG. 6(b), when the mold release vessel 61 reaches the upper end, the cone section 12 is pushed upward by the pusher member 62. In other words, with the upper end of the pusher member 62 pressed against the lower surface of the cone section 12, the support ring 5 is pushed downward. Specifically, the support ring 5 moves downward relative to the pusher member 62 and, as a result, the cone section 12 and the aperture section 14 are pulled radially outward, the aperture section 14 is expanded, and the part of the main mold section 11 close to the aperture section 14 is peeled from the molded product SH.

During the elevation of the mold release vessel 61, the upper surface of the molded product SH contacts and becomes attached to the suction pad 74, and the vacuum rod 72 moves upward accompanying the elevation of the molded product SH.

Figure 6C:
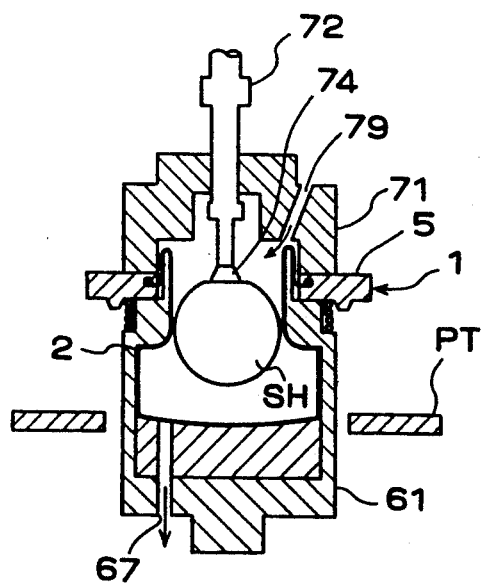
Figure 6D:
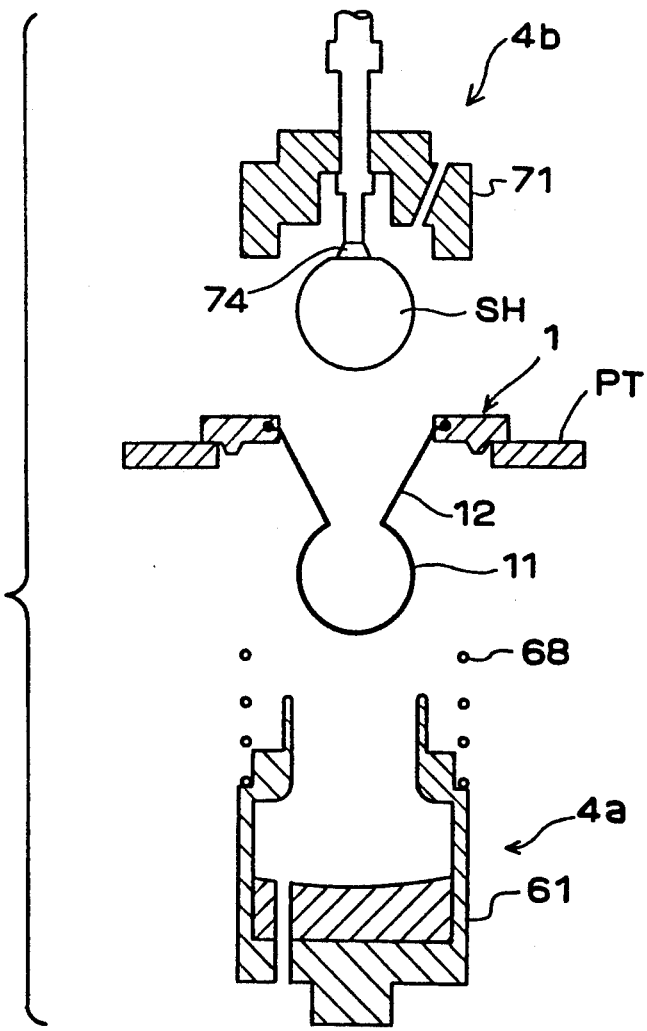

In addition, at a suitable timing for the interval from the state shown in FIG. 6(a) until the state shown in FIG. 6(b) is reached, compressed air is supplied from the feed and exhaust port 79. Also, instead of supplying compressed air from the feed and exhaust port 67, the air in the chamber H1 is exhausted and a negative pressure is created in the chamber H1. By this means, the peeling away of the elastic forming die 2 from the molded product SH is facilitated, and as shown in FIG. 6(c), the elastic forming die 2 is completely peeled away from the molded product SH and reaches the state where it is pressed against the inner peripheral surface of the mold release vessel 61.

Next, the supply of compressed air from the feed and exhaust port 79 is halted, the upper restraining device 71 and the vacuum rod 72 are elevated by the elevating drive device 76 and the elevating drive device 78, and the molded product SH which is attached to the vacuum pad 74 is elevated to a position where the conveyor CV and the pallet PT are not obstructed. In addition, the exhausting of the air from the feed and exhaust port 67 is halted, and the mold release vessel 61 is moved to the end of its descent by the elevating drive device 69. At the same time the elastic forming die device 1 descends and is loaded at the original position onto the pallet PT. The lower device 4a then returns to its original position at which it does not obstruct the conveyor CV [the state shown in FIG. 6(d)].

Following this, the upper device 4b is moved in the direction perpendicular to its bottom surface in FIG. 5 by means of a removal device (omitted from the drawing), the suction on the suction pad 74 is cut off, and the molded product SH is removed by the removal conveyor (omitted from the drawing).

The now-empty elastic forming die device 1 is transported to the next station by means of the pallet PT and the conveyor CV.

By means of the foregoing embodiment, the cone section 12 and the aperture section 14 are easily and uniformly expanded by the relative movement of the pusher member 62 and the support ring 5, and the upper part of the main mold section 11 can be easily and reliably peeled away from the molded product SH. Accordingly, using compressed air or negative pressure or the like, it is subsequently possible to peel the entire elastic forming die 2 away from the molded product SH and perform the mold release of the molded product SH reliably and quickly. In addition, because the cone section 12 and the aperture section 14 are uniformly expanded in the peripheral direction, there is very little concern about damage to the elastic forming die 2 and the life expectancy of the elastic forming die 2 is extended. Furthermore, the structure of the mold release device 4 is simple because it is expanded by the relative vertical motion of the pusher member 62 and the support ring 5. The horizontal dimension of the mold release device 4 is not large, therefore the area required to install it is small.

In the foregoing embodiment, by elevating the lower device 4a, the elastic forming die device 1 is elevated, and the ring section 12 is expanded. Because the mold release by compressed air and negative pressure and removal by the suction pad 74 of the molded product SH are performed continuously, the operations of expansion, mold release, and removal are performed continuously and in a short time.

By means of the foregoing embodiment, because the support ring 5 is installed on the elastic forming die device 1, the elastic forming die 2 can be handled very easily. Also, because the engaging ring section 25 is provided for positioning the support ring member 5, the engaged positioning of the pusher member 62 and the support spring 68 is performed easily by utilizing the taper of the engaging ring section 25.

In the foregoing embodiment, by setting the height at which the upper device 4b is positioned at an even higher position initially, there is no longer any necessity for the upper device 4b to be elevated when the molded product SH is removed, attached to the suction pad 74. Accordingly, in such a case, it is possible to eliminate the elevating drive device 76 or the elevating drive device 78.

In the foregoing embodiment, both negative pressure from the feed and exhaust port 67 and compressed air from the feed and exhaust port 79 are used to peel away the main mold section 11 from the molded product SH. However, it is possible to use only one of these. It is also possible to make various adjustments to the timing of the supply of the compressed air or negative pressure. By using a synthetic resin or the like with lubricating capabilities as the material of construction for the pusher member 62, the pusher member 62 can be made to slide extremely easily on the cone section 12. The flow of air to reduce the friction resistance with the cone section 12 can also be eliminated.

In the foregoing embodiment, it is possible to make various changes to the construction, shape, dimensions, material of construction, and the like for the release device 4, the elastic forming die device 1, the elastic forming die 2, the support ring 5, the base mold 7, the conveyor CV, or the pallets PT, or to the pressure of the compressed air or the negative pressure, and the like.

By means of the present invention, because a cone section which expands outwardly is connected to the aperture section of the main mold section, the handling is easy and it is easy to remove the elastic forming die or the molded product. By this construction for the present invention, an elastic forming die which does not waste elastic material and its method of construction are provided.

By means of the present invention, a molding method by which it is possible to easily release the solidified charged molded product inside the elastic forming die from the elastic forming die, and a molding device are provided.

Obviously, numerous modifications and variations of the present invention are possible in light of the above teachings. It is therefore to be understood that within the scope of the appended claims, the invention may be practiced otherwise than as specifically described herein.

What is claimed is:

1. A molding device for a charged molded product which releases the charged molded product which has been solidified inside a main mold section from an elastic forming die comprising:
a main mold section in membrane form which is a female mold for the molded product; said membrane having an outer peripheral edge, said main mold section having an outer form,
a conical section in membrane form which is connected to an aperture section of the main mold section and expands outwardly in the shape of a cone, said conical section having an outer cylindrical edge and a bottom; and
a ring-shaped support member mounted on the outer cylindrical edge of the conical section, said support member having an inner form, wherein said device further comprises a mold release device comprising:
a ring-shaped pusher member with an outer form smaller than the inner form of the support member and an inner form larger than the outer form of the main mold section, which is positioned on the bottom of the conical section, said mold release device utilizing a vacuum in a mold release vessel to peel away the main mold section from the molded product;
a transfer member for moving the support member downward relative to the pusher member; and
a removal member for removing the charged molded product away from the forming die.

2. The molding device for a charged molded product as in claim 1, wherein the pusher member is provided on an upper end section of a mold release vessel contained inside the main mold section; and the mold release vessel is provided with a feed and discharge orifice for feeding and discharging air into and out of the mold release vessel.

* * * * *